May 14, 1957  C. N. HOUSE  2,792,264
ANTI-FRICTION BEARING
Filed July 22, 1954  2 Sheets-Sheet 1
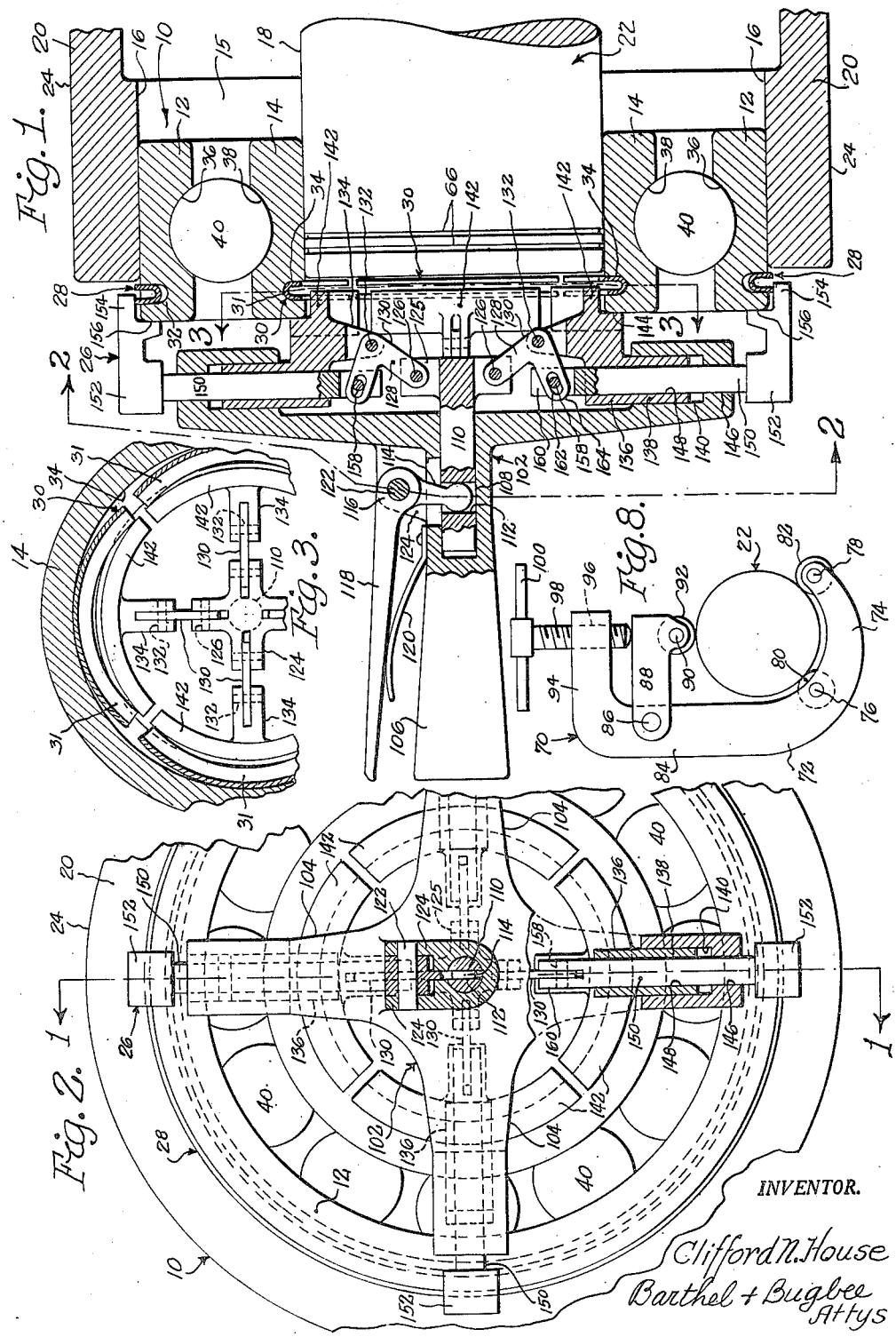
INVENTOR.
Clifford N. House
Barthel + Bugbee
Attys

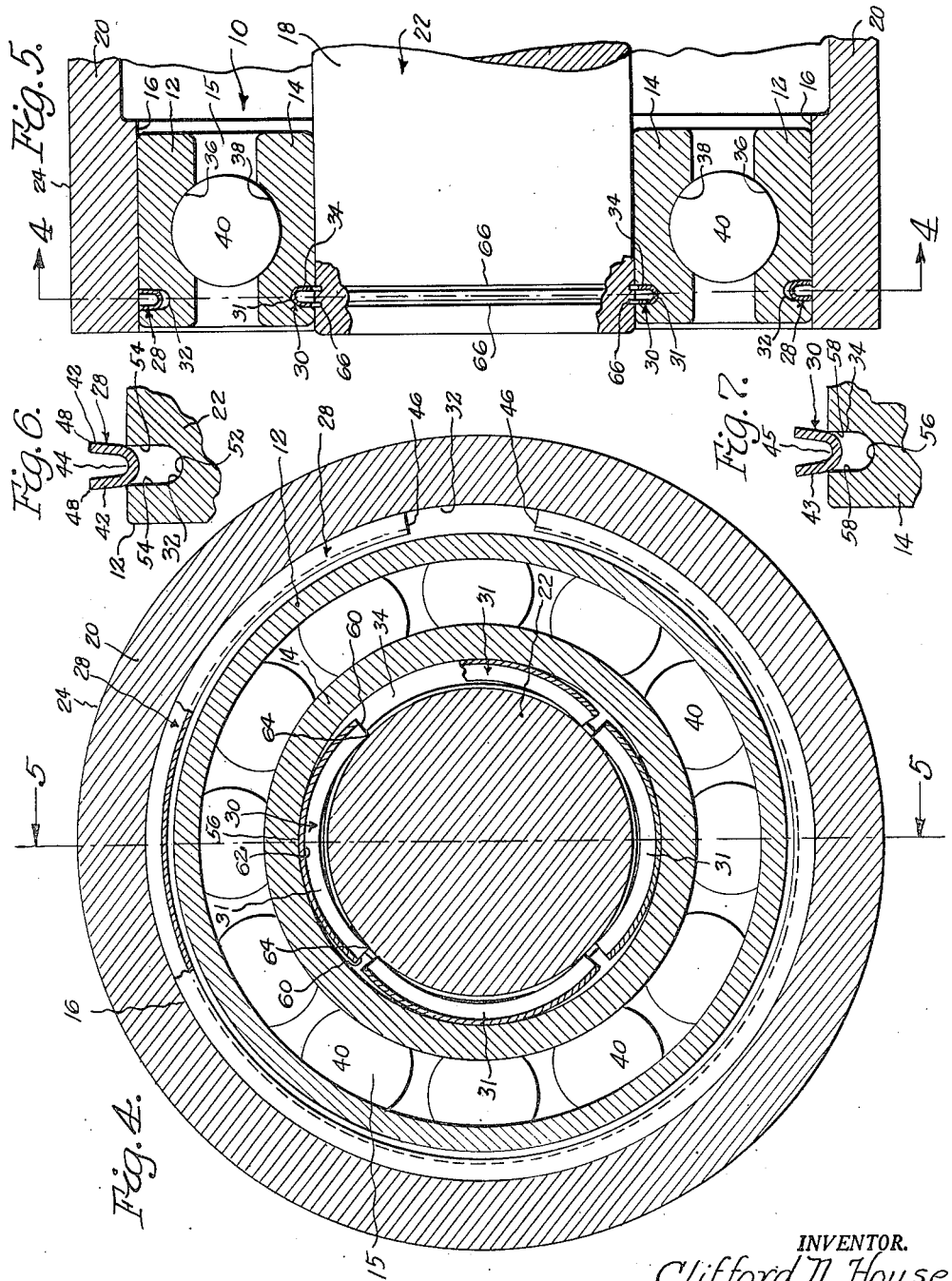

United States Patent Office 2,792,264
Patented May 14, 1957

2,792,264

ANTI-FRICTION BEARING

Clifford N. House, Royal Oak, Mich.

Application July 22, 1954, Serial No. 445,127

8 Claims. (Cl. 308—236)

This invention relates to anti-friction bearings, and in particular to means for retaining the races or rings of such bearings in position.

One object of this invention is to provide an anti-friction bearing having improved means for retaining the inner or outer race of the bearing in position on the shaft or other element or structure on which it is mounted.

Another object is to provide an anti-friction bearing of the foregoing character wherein the race or ring is provided with a groove or similar recess in which the retaining means is mounted, this retaining means consisting of a split ring of U-shaped cross-section or a composite ring made up of a plurality of arcuate segments of U-shaped cross-section.

Another object is to provide an anti-friction bearing of the foregoing character wherein the U-shaped ring or segments are of resilient material with outwardly-flared sides so that the resilient engagement of these sides against the side walls of the groove exerts a frictional force sufficient to retard relative rotation between the race and the ring or section thereof, the edge of the ring or segments thereof gripping the shaft or bore in which the race is mounted so as to prevent both relative rotation and relative axial motion between the race and the shaft or bore in which it is mounted.

Another object is to provide an anti-friction bearing of the foregoing character wherein the cylindrical mounting surface, such as the shaft engaged by the retaining ring or segments of the bearing race is itself provided with shallow grooves to receive the edges of the ring or segments, thereby further assisting in preventing relative rotation and relative axial motion between the bearing race and the shaft.

Another object is to provide an improved machine for seating the retaining ring or segments in their respective grooves, according to the present invention.

Other objects and advantages of the invention will become apparent during the course of the following description of the accompanying drawings, wherein:

Figure 1 is a central longitudinal section, taken along the line 1—1 in Figure 2, through an anti-friction bearing equipped with race retaining means according to the present invention, shown in the process of being installed by a seating machine, also according to the present invention;

Figure 2 is a left-hand side elevation, partly in section, along the line 2—2 in Figure 1, of the bearing and seating machine shown therein;

Figure 3 is a cross-section taken along the line 3—3 in Figure 1;

Figure 4 is a cross-section taken along the line 4—4 in Figure 5 through an anti-friction bearing with its outer and inner races secured to a bore and shaft respectively by retaining means according to the present invention;

Figure 5 is a longitudinal section, taken along the line 5—5 in Figure 4;

Figure 6 is an enlarged fragmentary view of the retaining ring or segment at the start of insertion in the groove of an outer bearing race;

Figure 7 is an enlarged fragmentary view of the retaining ring or segment at the start of insertion in the groove of an inner bearing race; and Figure 8 is a diagrammatic view of a device for grooving the shaft shown in Figures 1 and 5.

Referring to the drawings in detail, Figures 1, 2, 5 and 6 show an anti-friction bearing, generally designated 10, having outer and inner races 12 and 14 mounted in an annular space 15 between a bore 16 and the external cylindrical surface 18 of a housing 20 and shaft 22 respectively. The housing 20 is shown, for convenience, as a hollow cylindrical member but it will be understood that the outer surface 24 thereof may be of any desired shape, or that the bore 16 may be in any kind of structure, such as an engine crank case, an axle housing, or other mount in which the outer race 12 is to be secured. Also shown somewhat diagrammatically in Figures 1, 2 and 3 is a seating machine, generally designated 26, for seating the outer and inner race retaining means 28 and 30 respectively in their respective annular grooves 32 and 34 in the outer and inner races 12 and 14. The outer race retaining means 28 is in the form of a split ring of approximately U-shaped cross-section whereas the inner race-retaining means 30 is in the form of multiple segments 31 of arcuate shape and approximately U-shaped cross section.

The outer and inner races 12 and 14 are provided with the usual annular ball race grooves 36 and 38 respectively, these being of arcuate cross-section of substantially the same radius as the radii of the anti-friction bearing balls 40 mounted to roll in these grooves 36 and 38 respectively. For simplification of showing, the races 12 and 14 are illustrated diagrammatically, the mounting of the bearing balls 40 in the races 12 and 14 being conventional and beyond the scope of the present invention.

The retaining rings or segments 28 and 30, the former being a single split ring and the latter being a series of segments, are of cross-section lying between U-shaped and V-shaped (Figures 6 and 7) in their removed condition. In other words, the retaining rings or segments 28 and 30 have slightly flared sides 42 or 43 interconnected by a rounded bridge portion 44 or 45, the sides 42 or 43 being flared outwardly relatively to one another. The opposite ends 46 of the split outer retaining ring 28 are spaced apart from one another by a gap, and the outer diameter of the ring 28 in its relaxed condition is normally larger than the diameter of the bore 16 into which it fits. Since the ring 28 is of resilient material, such as spring steel, it must be forced into a smaller diameter circle than its normal diameter in order to insert it in the bore 16, so that when it is released it springs outward, forcing its edges 48 into firm gripping engagement with the bore 16. The groove 32 is of sufficient depth to permit the ring 28 to enter it freely and is of approximately U-shaped configuration with a rounded bottom surface 52 conforming to the rounded shape of the bridge portion 44 and with parallel side surfaces 54 resiliently engaged by the side portions 42 of the ring 48 as they are forced into parallelism against the side walls 54, as explained below in connection with the operation of the invention.

The retaining segments 31 of the inner race retaining means 30 are, as previously stated, of arcuate shape and of cross-section between U-shaped and V-shaped, as described above in connection with the outer race retaining ring 28. Each of the segments 31, however, has a smaller normal or relaxed diameter than the diameter of the bottom portion 56 of the groove 34 in the inner race 14, the sides 58 of which are parallel to one another (Figure 7). Under these circumstances, when the segments 31 are inserted in their respective grooves 34 (Figure 4), their opposite ends 60 must be forced outward so that the segment 31 takes the form of an arc of larger diameter. As a result, therefore, the midportion 62 of each segment serves as a fulcrum engaging the bottom 56 of the groove 34, whereas the corners 64 at the opposite ends thereof dig into the external surface 18 of the shaft 22, namely in axially-spaced shallow grooves 66 formed in the shaft 22 at the location where it is desired to locate the retaining ring 30. As stated before, in its normal or relaxed condition, the sides 43 of the segments 30 are flared outward (Figure 7) so that when they are forced into the groove 34, their sides 43 become parallel and, being of spring material, snugly and frictionally engage the side walls 58 of the groove 34.

The grooves 66 in the shaft 22 may be machined, as in a turning lathe, or they may be rolled into the shaft by the grooving device, generally designated 70, shown in Figure 8. This grooving device 70, which is shown diagrammatically for purposes of simplicity, consists of an approximately J-shaped frame member 72 having an arcuate lower end 74 bored to receive arcuately-spaced axles 76 and 78 carrying grooving wheels 80 and 82 respectively. The frame member 72 also has a straight or shank portion 84 bored to receive a pivot pin 86 upon which is pivotally mounted an arm 88 bored to receive an axle 90 on which a third grooving wheel 92 is mounted, the three grooving wheels 80, 82 and 92 being disposed at approximately 120° apart. The frame 72 is also provided with a perpendicularly bent portion 94 which is disposed substantially at right angles to the straight or shank portion 84 and which is bored and threaded as at 96 in a direction approximately radial to the shaft 22 in position on the grooving wheels 80 and 82, and containing a screw 98 having a handle 100 whereby it may be rotated to engage and force the outer end of the arm 88, and consequently the grooving wheel 92 downward toward the grooving wheels 80 and 82. At the same time, the shaft 22 and grooving device 70 are rotated relatively to one another to produce each of the grooves 76. Optionally the grooving wheels 80, 82 and 92 may be provided with two annular edges spaced axially from one another the same distance as the desired spacing of the grooves 66 so as to roll both grooves 66 into the external surface 18 of the shaft 22 simultaneously.

*Retainer seating machine*

The retainer seating machine 26, whereby the retaining rings 28 or segments 31 are inserted in their respective grooves 32 or 34 is shown diagrammatically in Figures 1, 2 and 3, and is only one of a number of devices which might be used for this purpose. The machine 26 includes a cross-shaped frame structure 102 with four radial arms 104 having a central handle 106 projecting perpendicularly therefrom. The handle 106 is bored as at 108 (Figure 1) to receive a reciprocating plunger 110 having a socket or cross bore 112 engaged by the lower end of one arm 114 of a bellcrank lever 116. The other arm 118 of the lever 116 is urged outward away from the handle 106 by a leaf spring 120 secured to the handle 106 in such a manner as to normally urge the plunger 116 rearwardly into its bore 108. The lever 116 is pivotally mounted upon a pivot pin 122 which in turn is mounted upon spaced ears 124 rising from the handle 106 adjacent its junction with the arms 104.

The plunger 110 at its free end is provided with spaced ears 125 arranged in pairs 90 degrees apart and each carrying a pivot pin 126 on which is pivotally mounted one end of one arm 128 of a bellcrank lever 130. The latter in turn is pivotally mounted on a pivot pin 132 supported on ears 134 integral with a slide block 136. The slide block 136, of which there is one for each arm 104, has a guide portion 138 preferably of rectangular cross-section reciprocably mounted in a radial guide bore 140, also preferably of rectangular cross-section. The slide block 136 carries an arcuate inner contact member 142 projecting inwardly therefrom inside the inner race 14, the four arcuate inner contact members 142 engaging the individual segments 31 of the inner race-retaining means 30 (Figure 3). Immediately outward of the arcuate inner contact members 142, the slide blocks 136 are provided with abutment shoulders 144 (Figure 1) which engage the ends of the inner races 14 to push them inward as the segments 31 are expanded into their respective grooves 34.

Each arm 104 and the slide block guide portion 138 are provided with aligned bores 146 and 148 respectively slidably receiving a rod 150 having a head 152 mounted on the outer end thereof and extending perpendicularly to the axis thereof. The end of the head 152, which is in the form of an arm, carries an outer contact member 154 adjacent an abutment portion 156 which engages the outer end of the outer bearing race 12 to push it into the bore 16 in the mount 20 as the outer contact member 154 engages the outer retaining ring 28 to force it inwardly into its respective groove 32. The rod 150 in each arm 104 and slide block 136 is reciprocated by means of a pin and slot connection consisting of a pin 158 mounted between ears 160 on the inner end of each rod 150. The pin 158 engages an elongated slot 162 in the other arm 164 of the bellcrank lever 130.

In the operation of the invention, let it be assumed that the space between the shaft 22 and the mount 20 is empty, and that the anti-friction bearing 10 is to be inserted therein, and the race retaining means 28 and 30 installed at the same time by means of the machine 26. The operator inserts a retaining ring 28 in the outer groove 32 and also the requisite number of retaining segments 31 in the groove 34 in the inner race 14, inserting the anti-friction bearing 10 into the space between the outer and inner contact portions 154 and 142 so as not only to hold the ring 28 and segments 31 in their respective grooves 32 and 34 but also to hold the outer and inner bearing races 12 and 14 against their respective abutments 156 and 144, while grasping the handle 106 and squeezing the bellcrank lever arm 118 toward the handle 106. This action firmly holds the bearing 10 in the machine 26 and at the same time forces the retaining ring 28 and segments 31 into their respective grooves 32 and 34.

When this occurs, the flared sides 42 and 43 of the retaining means 28 and 30 are forced inward (Figures 6 and 7) so as to become parallel with one another and engage the side walls 54 and 58 respectively of the grooves 32 and 34 (Figure 5). In this condition, the retaining means 28 and 32 frictionally engage the side walls 54 and 58 because of the resilient material, such as spring steel, from which the retaining means 28 and 30 are constructed. The lever arm 118 is squeezed sufficiently to bring it close enough to the handle 106 in order to push the plunger 110 outward from the bore 108. The consequent motion of the ears 124 transmitted to the bellcrank levers 130 simultaneously causes the slide blocks 136 to move radially outward, while at the same time the rods 150 and their heads 152 move inward. As a result, the inner arcuate contact portions 142 move outward to seat the segments 31 in their grooves 34 while the outer contact portions 154 move radially inward to seat the outer retaining ring 28 in its groove 32 (Figure 1). When the segments 31 and the ring 28 are thus seated in their respective grooves 34 and 32, the bearing 10 can be inserted between the bore 16 and the shaft outer surface 18 (Figure 1) and slid into the space 15 so that the ring 28 and segments 31 pass into this same space 15. Once the ring 28 and segments 31 have entered the space 15, the machine 26 may be removed by releasing the lever arm 118, whereupon the spring 120 will cause the plunger 110 to be moved into the bore 108, thereby causing the retaining means engagement portions 154 and 142 to move away from one another and release their grip upon the anti-friction bearing 10. The latter may then be pushed completely into the space 15 until the edges of the segments 31 drop into the grooves 66 in the shaft 22 (Figure 5).

With the inner race retaining segments 31 in their positions engaging the shaft grooves 66, and the outer race-retaining ring 28 engaging the bore 16 in the mount 20 (Figure 5), the races 12 and 14 of the anti-friction bearing 10 are incapable either of rotation or of axial motion relatively to their respective surfaces 16 and 18 of the mount 20 and shaft 22 respectively. The retaining ring 28 and the retaining segments 31 by reason of their dissimilarity of radii of curvature to the spaces into which they are to fit, exert powerful gripping action on the bore 16 and shaft surface 18 respectively, so that undesired relative motion is completely overcome.

What I claim is:

1. A race-retaining anti-friction bearing construction for preventing rotary and axial motion relatively to a generally cylindrical mounting surface, said construction comprising radially-spaced generally outer and inner annular anti-friction bearing races, a multiplicity of rollable elements of circular cross-section disposed between said races in rolling engagement therewith, at least one of said races having a generally annular recess therein, and a discontinuous generally-annular race retainer of generally U-shaped cross-section having circumferentially-spaced ends and approximately-radial circumferentially-extending side flanges disposed in said recess with the edges of said flanges engaging said mounting surface, said retainer being of resilient material with said edges resiliently urged into edgewise gripping engagement with said mounting surface.

2. A race-retaining anti-friction bearing construction for preventing rotary and axial motion relatively to a generally cylindrical mounting surface, said construction comprising radially-spaced generally annular outer and inner anti-friction bearing races, a multiplicity of rollable elements of circular cross-section disposed between said races in rolling engagement therewith, at least one of said races having a generally annular recess therein, and a discontinuous generally-annular race retainer of generally U-shaped cross-section having circumferentially-spaced ends and approximately-radial circumferentially-extending side flanges disposed in said recess with the edges of said flanges engaging said mounting surface, said retainer being of resilient material with said edges resiliently urged into edgewise gripping engagement with said mounting surface, said side flanges of said retainer being outwardly-flared and disposed wider apart at their free edges before assembly than the width of said recess whereby to resiliently engage the side walls of said recess.

3. A race-retaining anti-friction bearing construction for preventing rotary and axial motion relatively to a generally cylindrical mounting surface, said construction comprising radially-spaced generally annular outer and inner anti-friction bearing races, a multiplicity of rollable elements of circular cross-section disposed between said races in rolling engagement therewith, at least one of said races having a generally annular recess therein, and a discontinuous generally-annular race retainer of generally U-shaped cross-section having circumferentially-spaced ends and approximately-radial circumferentially-extending side flanges disposed in said recess with the edges of said flanges engaging said mounting surface, said retainer being of resilient material with said edges resiliently urged into edgewise gripping engagement with said mounting surface, said retainer having a radius substantially different from the radius of said mounting surface.

4. A race-retaining anti-friction bearing construction for preventing rotary and axial motion relatively to a generally cylindrical mounting surface, said construction comprising radially-spaced generally annular outer and inner anti-friction bearing races, a multiplicity of rollable elements of circular cross-section disposed between said races in rolling engagement therewith, at least one of said races having a generally annular recess therein, and a discontinuous generally-annular race retainer of generally U-shaped cross-section having circumferentially-spaced ends and approximately-radial circumferentially-extending side flanges disposed in said recess with the edges of said flanges engaging said mounting surface, said retainer being of resilient material with said edges resiliently urged into edgewise gripping engagement with said mounting surface, said side flanges of said retainer being outwardly-flared and disposed wider apart at their free edges before assembly than the width of said recess whereby to resiliently engage the side walls of said recess, said retainer having a radius substantially different from the radius of said mounting surface.

5. A race-retaining anti-friction bearing construction for preventing rotary and axial motion relatively to a generally cylindrical mounting surface, said construction comprising radially-spaced generally annular outer and inner anti-friction bearing races, a multiplicity of rollable elements of circular cross-section disposed between said races in rolling engagement therewith, at least one of said races having a generally annular recess therein, and a discontinuous generally-annular race retainer of generally U-shaped cross-section having circumferentially-spaced ends and approximately-radial circumferentially-extending side flanges disposed in said recess with the edges of said flanges engaging said mounting surface, said retainer being of resilient material with said edges resiliently urged into edgewise gripping engagement with said mounting surface, said side flanges of said retainer being outwardly-flared and disposed wider apart at their free edges before assembly than the width of said recess whereby to resiliently engage the side walls of said recess, said retainer having a radius substantially different from the radius of said mounting surface, said retainer having a gap therein and ends adjacent said gap yieldably gripping said mounting surface.

6. A race-retaining anti-friction bearing construction for preventing rotary and axial motion relatively to a generally cylindrical mounting surface, said construction comprising radially-spaced generally annular outer and inner anti-friction bearing races, a multiplicity of rollable elements of circular cross-section disposed between said races in rolling engagement therewith, at least one of said races having a generally annular recess therein, and a discontinuous generally-annular race retainer of generally U-shaped cross-section having circumferentially-spaced ends and approximately-radial circumferentially-extending side flanges disposed in said recess with the edges of said flanges engaging said mounting surface, said retainer being of resilient material with said edges resiliently urged into edgewise gripping engagement with said mounting surface, said side flanges of said retainer being outwardly-flared and disposed wider apart at their free edges before assembly than the width of said recess whereby to resiliently engage the side walls of said recess, said retainer having a radius substantially different from the radius of said mounting surface, said recess having a bottom of rounded cross-section and said retainer having a bridge portion of rounded cross-section interconnecting said side flanges and engaging said bottom.

7. A race-retaining anti-friction bearing construction for preventing rotary and axial motion relatively to a generally cylindrical mounting surface, said construction comprising radially-spaced generally annular outer and inner anti-friction bearing races, a multiplicity of rollable elements of circular cross-section disposed between said races in rolling engagement therewith, at least one of said races having a generally annular recess therein, and a discontinuous generally-annular race retainer of generally U-shaped cross section having circumferentially-spaced ends and approximately-radial circumferentially-extending side flanges disposed in said recess with the edges of said flanges engaging said mounting surface, said retainer being of resilient material with said edges resiliently urged into edgewise gripping engagement with said mounting surface, said mounting surface having grooves therein spaced apart from one another at the approximate separation of said edges, the tips of said edges entering and grippingly engaging said grooves.

8. A race-retaining anti-friction bearing construction for preventing rotary and axial motion relatively to a generally cylindrical mounting surface, said construction comprising radially-spaced generally annular outer and inner anti-friction bearing races, a multiplicity of rollable elements of circular cross-section disposed between said races in rolling engagement therewith, at least one of said races having a generally annular recess therein, and a discontinuous generally-annular race retainer including a plurality of generally arcuate retaining members disposed in a generally annular path, certain of said members being of generally U-shaped cross-section having circumferentially-spaced ends and approximately-radial circumferentially-extending side flanges disposed in said recess with the edges of said flanges engaging said mounting surface, said retainer being of resilient material with said edges resiliently urged into edgewise gripping engagement with said mounting surface.

References Cited in the file of this patent

UNITED STATES PATENTS

| | | |
|---|---|---|
| 1,776,646 | Wilson | Sept. 23, 1930 |
| 2,313,763 | Olsen | Mar. 16, 1943 |
| 2,322,949 | Lux | June 29, 1943 |
| 2,476,586 | Darash | July 19, 1949 |
| 2,628,113 | Jones | Feb. 10, 1953 |
| 2,650,866 | Knudson | Sept. 1, 1953 |